United States Patent [19]

Lavender

[11] Patent Number: 5,022,495
[45] Date of Patent: Jun. 11, 1991

[54] OIL FILL TUBE ASSEMBLY

[75] Inventor: Stephen J. Lavender, Milwaukee, Wis.

[73] Assignee: Briggs & Stratton Corporation, Wauwatosa, Wis.

[21] Appl. No.: 481,215

[22] Filed: Feb. 20, 1990

[51] Int. Cl.$^5$ ............................................. F16N 21/00
[52] U.S. Cl. .................................. 184/105.1; 184/1.5; 220/86.2
[58] Field of Search ......................... 184/1.5, 6.4, 88.1, 184/92, 105.1, 108; 141/326, 369, 370, 372, 374, 391, 392; 220/86 R, 85 F, 85 S, 86.2; 206/319, 459

[56] References Cited

U.S. PATENT DOCUMENTS

| | | | |
|---|---|---|---|
| 635,717 | 10/1899 | Emerick | 184/92 |
| 1,351,338 | 8/1920 | Magee | 184/105.1 |
| 1,383,746 | 7/1921 | Newton | 184/105.1 |
| 1,440,554 | 1/1923 | Rose | 184/105.1 |
| 1,650,021 | 11/1927 | Magee | 184/105.1 |
| 2,192,543 | 3/1940 | Dell | 184/1.5 |
| 2,229,054 | 1/1941 | Dick | 184/105.1 |
| 2,579,065 | 12/1951 | Channell | 141/370 |
| 2,663,084 | 12/1953 | Coderre | 184/108 |
| 2,750,003 | 6/1956 | Smith | 184/105.1 |
| 2,801,767 | 8/1957 | Mariani | 220/86 R |
| 3,070,255 | 12/1962 | Krake | 220/86.2 |
| 3,181,745 | 5/1965 | Grobowski | 222/539 |
| 3,474,884 | 10/1969 | Braun | 184/1.5 |
| 3,735,494 | 5/1973 | Guntow | 33/126.7 R |
| 4,331,185 | 5/1982 | Rinaldo | 141/95 |
| 4,403,466 | 9/1983 | Tillotson | 56/16.7 |
| 4,509,567 | 4/1985 | Harrison et al. | 141/326 |
| 4,582,030 | 4/1986 | Reese | 123/185 |

Primary Examiner—Ira S. Lazarus
Assistant Examiner—Alan B. Cariaso
Attorney, Agent, or Firm—Andrus, Sceales, Starke & Sawall

[57] ABSTRACT

An oil fill tube assembly for an internal combustion engine. The assembly includes a tube having a lower end communicating with the crankcase of the engine and an open upper end that is enclosed by a cap. The undersurface of the cap carries a dipstick which extends downwardly within the tube. The upper end of the tube has a pair of locking elements which are spaced circumferentially with the spaces between the elements being of different circumferential dimension. The lower edge of a peripheral flange on the cap has a pair of locking lugs of different circumferential dimension that are constructed and arranged to be received within the spaces between the locking elements of the tube as the cap is inserted on the tube. The locking elements and the locking lugs are provided with mating cam surfaces so that when the cap is rotated one quarter of a turn, a seal on the under surface of the cap will be forced against the upper end of the tube to tightly seal the cap to the tube.

13 Claims, 2 Drawing Sheets

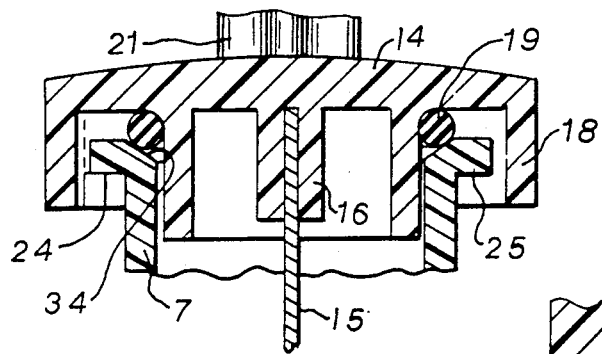
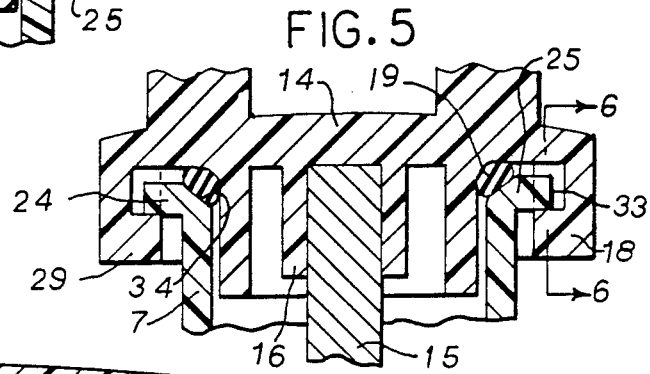
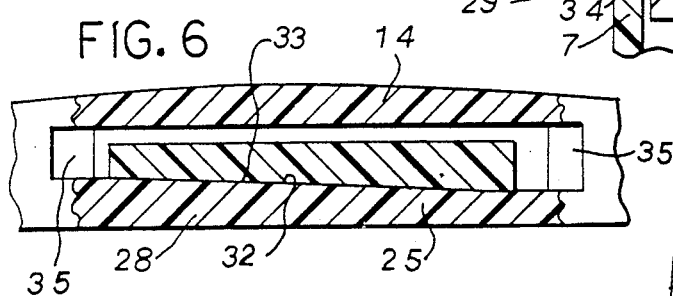
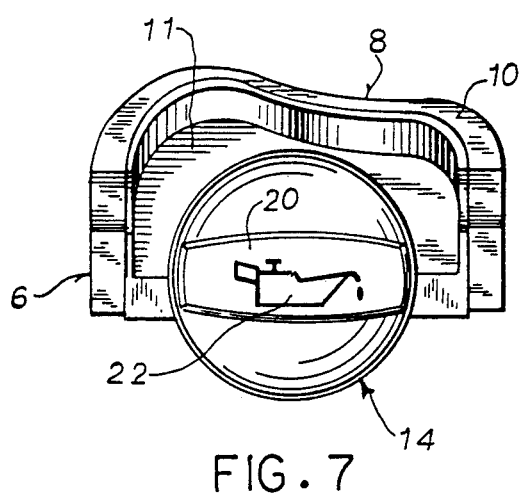
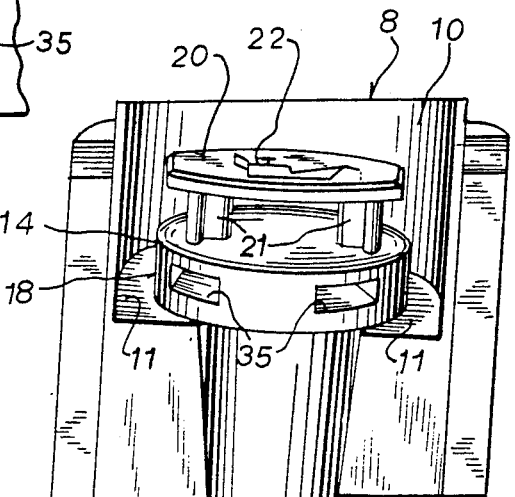

OIL FILL TUBE ASSEMBLY

BACKGROUND OF THE INVENTION

Dipsticks are commonly incorporated with internal combustion engines to provide a visual check as to the level of oil in the engine crankcase. A typical dipstick is a flat rod that extends down through a tube into the crankcase or other oil reservoir and the upper end of the dipstick carries a cap which is secured to the upper portion of the tube and supports the dipstick within the tube. On certain engines, particularly single cylinder engines, the dipstick extends down into the crankcase through the oil fill tube, and is secured to the cap that encloses the upper end of the oil fill tube.

With small engines such as used with lawnmowers and the like, it is important that the cap be sealed to the upper end of the oil fill tube to prevent leakage of oil from the tube in the event the engine is tilted during usage. In some instances, the cap is threaded to the upper end of the fill tube, but the threaded connection is not feasible where the fill tube is bent to follow the configuration of a non-linear fill tube.

U.S. Pat. No. 3,474,884 assigned to a common assignee with the present application, shows an oil fill tube assembly in which the cap which carries the dipstick is secured to the upper end of the tube by flexible prongs which extend downwardly from the undersurface of the cap and engage ledges on the inner surface of the fill tube. However, the construction shown on the aforementioned patent does not provide a positive type seal and the cap is not oriented with the fill tube and engine, meaning that any logo or instructions on the cap are not necessarily assembled in the same relation to the fill tube at all times.

SUMMARY OF THE INVENTION

The invention is directed to an improved oil fill tube assembly for an internal combustion engine. In accordance with the invention, the assembly includes a tube having a lower end communicating with the crankcase of the engine and an open upper end that is enclosed by a cap. A dipstick is secured to the undersurface of the cap and extends downwardly through the fill tube to the crankcase of the engine.

To secure the cap to the fill tube, the upper end of the tube is provided with a pair of circumferentially-spaced locking elements with the spaces between the locking elements being of different circumferential dimension. The cap is provided with a peripheral flange and the lower edge of the flange has a pair of locking lugs which are configured to be received within the spaces between the locking elements on the tube as the cap is assembled to the tube.

The locking elements on the tube and the lugs on the cap are provided with mating cam surfaces so that as the cap is rotated approximately one quarter of a turn, a sealing ring on the undersurface of the cap will be forced against the upper end of the tube to provide a positive seal between the cap and the tube.

The construction of the invention provides a positive seal between the cap and the fill tube which can be effected by merely rotating the cap approximately 90° thus providing an assembly that is more easily installed and removed.

As the locking elements on the cap and tube are asymmetrical, the cap can be assembled with the tube only in one orientation. The upper surface of the cap will normally bear indicia such as a drawing or logo of an oil can, and as the cap can be assembled with the tube only in a single position, the indicia will always be properly oriented with respect to the fill tube and engine.

The lower end of the dipstick will normally bear printing such as the words "fill" and "add." The printing is positioned relative to the locking elements, so that as the cap is removed, the printing on the dipstick will be facing the operator so that it is readily visible.

Other objects and advantages will appear during the course of the following description.

DESCRIPTION OF THE DRAWINGS

FIG. 4 is a section taken along line 4—4 of FIG. 3 and showing the cap in an unlocked condition;

FIG. 5 is a view similar to FIG. 4 and showing the cap in a locked condition;

FIG. 6 is a section taken along line 6—6 of FIG. 5;

FIG. 7 is a top plan view of the oil fill tube assembly; and

FIG. 8 is a front elevation of the assembly.

DESCRIPTION OF THE ILLUSTRATED EMBODIMENT

Figure 1:
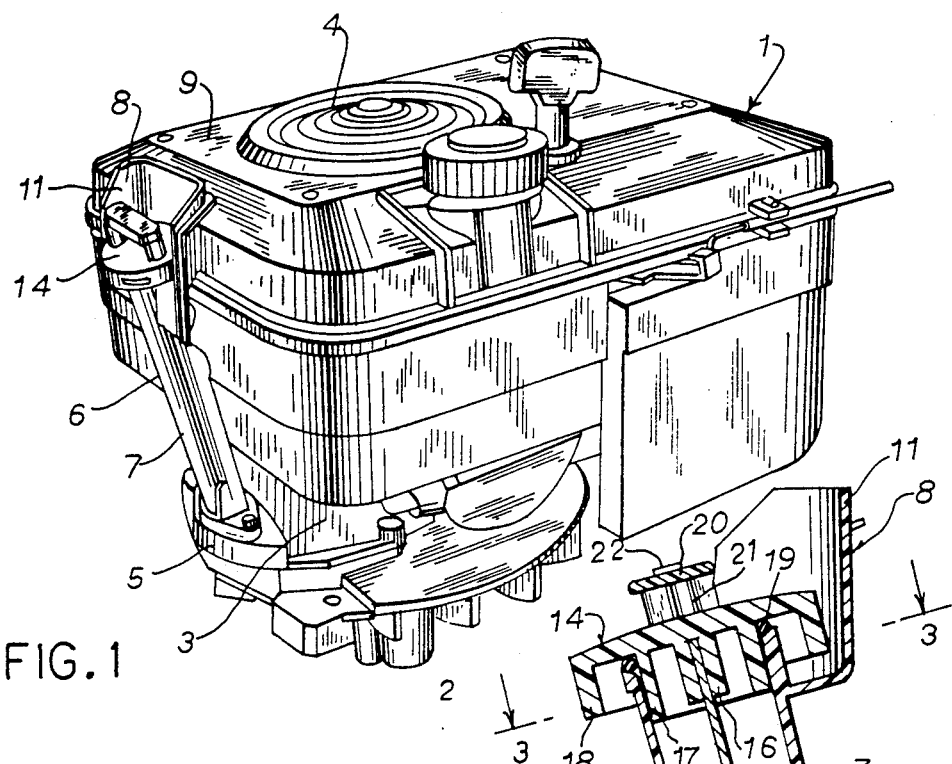
FIG. 1 is a perspective view of a small horsepower internal combustion engine incorporating the oil fill tube assembly of the invention.

FIG. 1 illustrates a small internal combustion engine 1, such as the type used with lawn and garden equipment. Engine 1 is of the vertical shaft type and includes a crankshaft 2 connected to a piston, not shown in cylinder 3, and a rotating air filtering screen 4.

Oil for the cylinder is contained within an oil sump 5, and oil can be supplied to the sump via an oil fill tube assembly 6, which is mounted on engine 1.

The oil fill tube assembly 6 includes a tube 7 which is disposed at a slight angle to the vertical, and a shield 8 connects the upper end of tube 7 to the engine housing 9. As shown in FIG. 7, shield 8 includes a generally U-shaped section 10 which is secured through inclined bottom surface 11 to opposite sides of tube 7.

A mounting flange 13 is formed integrally with the lower end of tube 7, and is secured via suitable screws to sump 5.

Attached to the upper end of tube 7 is a cap 14. A dipstick 15 is secured within a slot in a central boss 16 on the undersurface of cap 14, and the dipstick extends downwardly through the tube with the lower end of the dipstick projecting into the crankcase of the engine.

Figure 2:
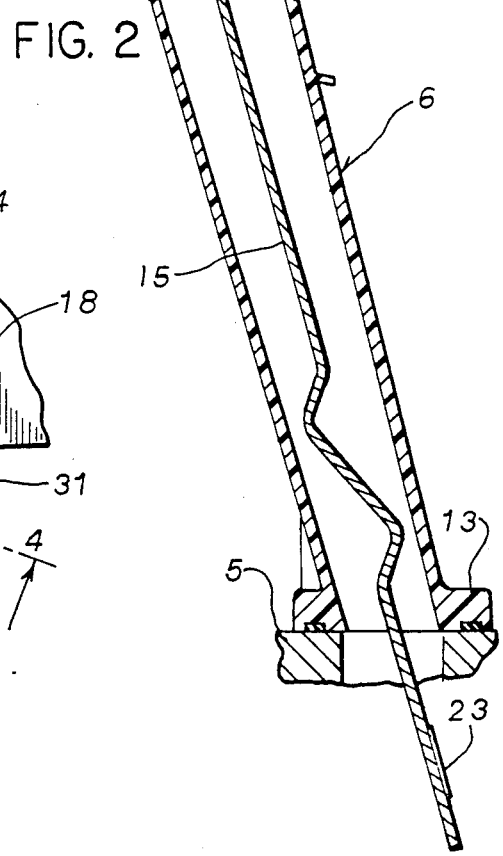
FIG. 2 is a longitudinal section of the oil tube fill assembly.

As best seen in FIG. 2, cap 14 is provided with an inner annular flange 17 which is received within the open upper end tube 7, and an outer peripheral flange 18 which is spaced radially from flange 17. A sealing ring 19 formed of a resilient material, is attached to the undersurface of the cap and is located outwardly of flange 17 in a position to engage the upper end of tube 7 as the cap is assembled with the tube.

A bar 20 is spaced upwardly from cap 14 and is connected to the cap via a pair of spaced legs 21. Bar 20 provides a finger grip which can be used to rotate the cap 14, as will be hereinafter described.

The upper surface of bar 20 bears indicia 22 which, as shown in FIG. 7, is a logo or drawing of an oil can. In addition, the lower end of the dipstick bears indicia or printing 23 which commonly would be the words "full" and "add," and the printing 23 faces in the opposite direction from the indicia or logo 22 on bar 20. This is best seen in FIG. 2 where the logo on bar 20 faces outwardly of the engine while the printing 23 on the dipstick faces inwardly toward the engine.

Figure 3:
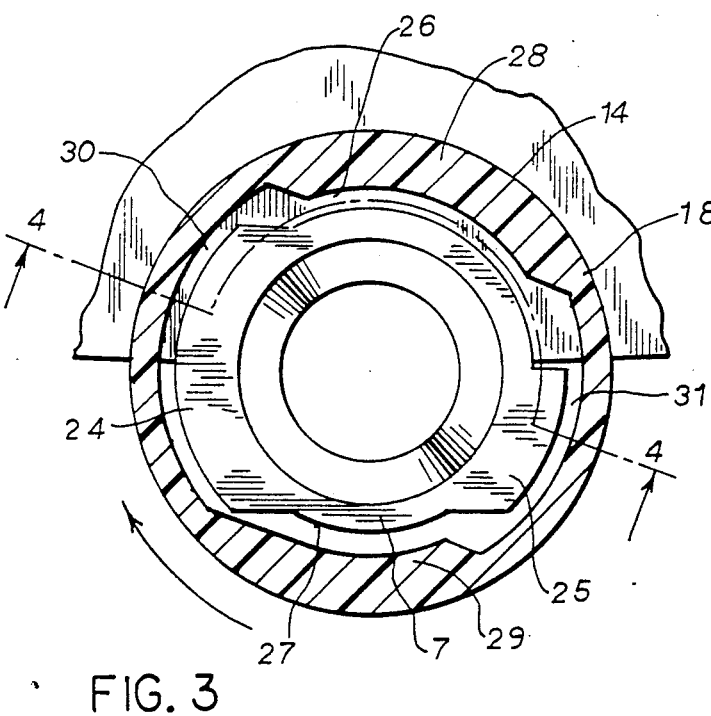
FIG. 3 is a section taken along line 3—3 of FIG. 2.

To secure cap 14 to tube 7, a pair of locking lugs 24 and 25 are provided on the upper end of tube 7. As best shown in FIG. 3, lug 24 has a greater circumferential dimension than lug 25, and the lugs are spaced apart to provide gaps 26 and 27 between the lugs. Gap 26 has a greater circumferential dimension than gap 27. Thus, the lugs 24 and 25 and gaps 26 and 27 are asymmetrical with respect to tube 7.

The lower edge of peripheral flange 18 of cap 14 is provided with a pair of inwardly extending lugs 28 and 29. Lugs 28 and 29 are constructed so that they will be received within gaps 26 and 27, respectively, as the cap is assembled to tube 7. As shown in FIG. 3, lug 28 has a greater circumferential dimension than lug 29, and similarly the gaps or spaces 30 and 31 between the corresponding ends of lugs 28 and 29 are of unequal circumferential dimension.

With this construction, cap 14 can be assembled only in one position or orientation with respect to tube 7, with lugs 28, 29 on cap registering with gaps 26 and 27 on tube 7, as illustrated in FIG. 3. The cap can then be rotated, causing the lugs 28, 29 to move beneath the lugs 24, 25. Lugs 28, 29 are provided with inclined surfaces 32 that ride against inclined surfaces 33 on lugs 24, 25 to provide a cam action to wedge the sealing ring 19 firmly against the beveled upper end 34 of tube 7, thus providing a positive seal between the cap and the tube.

The tube 7 shield 8 and cap 14 are preferably molded from plastic materials, and the outer surface of flange 18 on the cap is formed with a series of openings 35 which provide no function in the assembly of the cap tube, but are necessary for the molding operation.

Due to the asymmetrical configuration of the lugs 24, 25 and 28, 29, the cap can be assembled only in one position or orientation relative to tube 7, and this insures that when the cap is rotated one quarter turn, or approximately 90° to the sealed position, that the logo 22 will be facing outwardly relative to the engine in a location where it can be read by an operator. The one position orientation of the cap relative to the tube, also insures that as the dipstick is withdrawn from the tube 7, the printing 23 from the dipstick will be in a position facing the operator so that it can be more readily read.

As the construction of the invention provides a positive seal of the cap to the fill tube with only a one quarter turn of the cap, the cap is easier to install and remove than conventional constructions utilizing a threaded connection.

Various modes of carrying out the invention are contemplated as being within the scope of the following claims particularly pointing out and distinctly claiming the subject matter which is regarded as the invention.

I claim:

1. An oil fill tube assembly for an internal combustion engine, comprising a tube having a lower end communicating with the crankcase of the engine and having an open upper end, a cap member to enclose said upper end and having a peripheral flange, a dipstick member connected to the cap member and extending downwardly within said tube, sealing means on the underside of the cap member and disposed to engage the upper end of said tube, a pair of locking lugs extending radially outward from the upper end of the tube, said lugs being spaced circumferentially to provide gaps therebetween of unequal circumferential dimension, a pair of locking elements on said flange, said locking elements having unequal circumferential dimensions and being constructed and arranged to register with the gaps when said cap member is installed in said tube, means to be engaged by an operator for rotating said cap member to thereby move said locking elements beneath said locking lugs to a locking position and provide a connection between said cap member and said tube, and indicia on an outer surface of one of said members and arranged relative to said locking elements such that said indicia will face in a predetermined direction when said locking elements are in the locking position.

2. The assembly of claim 1, and including cam means operably connecting said lugs and said locking elements for moving said cap member axially relative to the tube as said cap member is rotated to thereby provide a tight engagement of said sealing means to the upper end of said tube.

3. The assembly of claim 1, wherein said cap member is provided with an inner annular flange spaced from said peripheral flange, said inner flange disposed to be received in the upper end of said tube.

4. The assembly of claim 3, wherein said sealing means is located between said peripheral flange and said inner flange.

5. The assembly of claim 1, wherein said indicia is on an outer surface of said cap member, said indicia being arranged relative to said locking elements such that said indicia will face outwardly of the engine when said locking elements are in said locking position.

6. The assembly of claim 5, wherein said indicia comprises a logo of an oil can.

7. An oil fill tube assembly for an internal combustion engine comprising a tube having a lower end communicating with an oil reservoir of an engine and having an open upper end, a cap to enclose the upper end of the tube, a dipstick connected to the cap and extending within said tube and into said reservoir, sealing means on the underside of said cap and disposed to engage the upper end of the tube, laterally extending flange means on the upper end of said tube and having at least one circumferential discontinuity therein, lug means on the cap and constructed and arranged to be received within said discontinuity as said cap is assembled to said tube, said lug means when received within said discontinuity being at a lower level than said flange means, said lug means and said flange means being constructed and arranged such that said lug means can only be inserted in said discontinuity in one circumferential orientation of said cap, means to be engaged by an operator for rotating said cap relative to said tube to thereby move said lug means beneath said flange means to a locking position to provide a connection between said cap and said tube, and indicia on an outer surface of said cap and arranged relative to said lug means such that said indicia will face outwardly of the engine when said lug means is in the locking position.

8. The assembly of claim 7, and including cam means operably interconnecting said flange means and said lug means for wedging the cap axially as the cap is rotated to provide a firm engagement between said sealing means and the upper end of said tube.

9. The assembly of claim 8, wherein said cam means includes a first inclined surface on said lug means and a second inclined surface on said flange means, said inclined surfaces being engageable on rotation of said cap.

10. The assembly of claim 8, wherein said cam means is constructed and arranged so that sealing means is fully engaged with said upper end of the tube on approximately 90° rotation of said cap.

11. The assembly of claim 7, and including an elongated bar secured to the outer surface of said cap and extending generally diametrically of said cap, said indicia disposed on the outer surface of said bar.

12. The assembly of claim 7, and including a shield connected to the upper end of said tube and defining a trough surrounding said tube.

13. The assembly of claim 12, wherein said shield extends approximately 180° around said tube.

* * * * *